United States Patent [19]

Vanek et al.

[11] Patent Number: 5,334,878

[45] Date of Patent: Aug. 2, 1994

[54] INVERTER CONTROL FOR THIRD RAIL HEAD END POWER

[75] Inventors: Laurence D. Vanek, Girard, N.Y.; Robert G. McGrath, North East, both of Pa.

[73] Assignee: General Electric Company, Schenectady, N.Y.

[21] Appl. No.: 46,833

[22] Filed: Apr. 13, 1993

[51] Int. Cl.⁵ ............................................. B60L 11/02
[52] U.S. Cl. ................................. 307/64; 191/4; 191/5; 191/9
[58] Field of Search ............... 290/45, 1 R, 3; 307/64, 307/66; 191/4, 5, 7

[56] References Cited

U.S. PATENT DOCUMENTS

| | | | |
|---|---|---|---|
| 4,523,059 | 7/1985 | Kawamura | 191/6 |
| 4,570,077 | 2/1986 | Lambley | 290/4 R |
| 4,900,944 | 2/1990 | Donnelly | 290/3 |
| 5,168,416 | 12/1992 | Bailey et al. | 361/31 |
| 5,180,939 | 1/1993 | Rosswurm | 310/27 |

*Primary Examiner*—A. D. Pellinen
*Assistant Examiner*—Aditya Krishnan
*Attorney, Agent, or Firm*—Marvin Snyder

[57] ABSTRACT

A system provides dual power producing capability to a diesel locomotive. The diesel engine drives the power generating system on the locomotive when the locomotive is operating under normal conditions. An inverter is provided to drive the power generating system on the locomotive and for supplying auxiliary and head end power when the locomotive is operating on third rail power and the engine is de-energized.

11 Claims, 3 Drawing Sheets ns to diesel electric passenger locomotives and, more specifically, to simplification of diesel electric passenger locomotive auxiliary and hotel power systems while operating on third rail power.

INVERTER CONTROL FOR THIRD RAIL HEAD END POWER

BACKGROUND OF THE INVENTION

The present invention relates to diesel electric passenger locomotives and, more specifically, to simplification of diesel electric passenger locomotive auxiliary and hotel power systems while operating on third rail power.

In a typical passenger locomotive, it is standard to have three systems which need to be powered. One system is the traction motor powering system for providing power to each traction motor, usually provided on each axle; a second system is the passenger car or hotel loads, such as lighting, heating, and air-conditioning; and a third system is the locomotive auxiliary loads, such as blowers, compressors, battery charging, and excitation requirements. Typically, for a locomotive, these systems are powered by the diesel engine.

However, there are some situations when the diesel engine is required to be off and, therefore, not available for powering the locomotive systems. For example, emission requirements may require that the diesel be shut down in tunnels which are used to carry both subway and locomotive traffic. In such situations, where the transportation system is operating on two rails, it is common to use third rail power as the power delivery system. The third rail power is used to provide the same locomotive functions that are normally provided by the diesel engine. Hence, a locomotive traveling through a tunnel, with the diesel de-energized, is operating similar to a transit car, where the power delivery system is provided by an electrified third rail.

When third rail power is used to provide the locomotive diesel engine functions, a certain amount of equipment is added to the locomotive power system. For instance, traction power is supplied directly from the third rail source through a series of resistors and contactors, in order to provide variable voltage/power capability, and to the series DC traction motors. The starting resistors and contactors are supplied specifically for this purpose.

In addition, locomotive auxiliary power requirements and head end power are provided by the head end power system. Head end power is provided from the third rail by a motor alternator set. This set utilizes a compound wound DC motor driving a three phase alternator. Starting resistors and contactors are supplied to bring the set up to its operating speed. A power transfer switch is then used to provide power for excitation, which requires inclusion of a motor excitation panel; power to run the locomotive auxiliaries at a reduced speed, thereby requiring an additional circuit breaker, transformer, and power transfer switch; the power for locomotive battery charging and air conditioning; and enough power for the passenger cars that are attached to the locomotive.

Prior art methods for providing third rail power are inefficient for several reasons. First, this additional equipment adds significant weight to the locomotive. Furthermore, duplication of the locomotive auxiliary and hotel power controls can cause the locomotive itself to be larger, to accommodate the installation of the additional equipment. Finally, some equipment is not used at all during third rail operation, including the diesel engine, several exciter panels, normal locomotive battery charger, main alternator, auxiliary alternator, normal head end power alternator, and main propulsion rectifiers.

It is seen then that there exists a need for a means of providing a diesel passenger locomotive with a more efficient dual power producing capability.

SUMMARY OF THE INVENTION

This need is met by the system according to the present invention, which provides a diesel locomotive with both diesel engine power capability and third rail power capability. In third rail power operation, the invention utilizes an inverter, wherein third rail power is conditioned by the inverter which drives the traction alternators and actually cranks the engine, thereby supplying power to the alternators connected to the same shaft. The traction alternator functions as an inverter driven synchronous motor in this mode. In normal circumstances, the diesel engine provides power to the locomotive. When the diesel is de-energized, the present invention provides the ability to power all three systems, i.e., traction motors, hotel loads, and auxiliary loads, from the third rail.

In accordance with one aspect of the present invention, a system provides dual power producing capability to a diesel locomotive. The diesel engine drives the power generating system on the locomotive when the locomotive is operating under normal conditions, i.e., where the diesel engine is on and is the sole source of electrical power. A means for causing the main alternator to function as a motor, such as an inverter, is provided to drive the power generating system of the locomotive when operating on third rail power with the diesel engine de-energized.

Accordingly, it is an object of the present invention to provide dual power producing capability to a diesel locomotive. It is a further object of the present invention to provide a means of simplifying the diesel electric passenger locomotive auxiliary and hotel power systems when operating on third rail power with the diesel de-energized.

These and other objects will become apparent from a reading of the ensuing description together with the appended drawings and claims.

DETAILED DESCRIPTION OF THE PREFERRED EMBODIMENTS

In third rail power operation, the same power system needs exist as when the locomotive is operating in its normal mode, i.e., with diesel engine operation. One power system is the traction motor powering system for providing power to each traction motor, usually provided on each axle. A second power system, the hotel loads, provides power for passenger cars requiring lighting, heating, and air-conditioning. A power third system is the locomotive auxiliary loads, which is the amount of auxiliary power required for equipment blowers, the alternator blower, the compressor motor, battery charging, and excitation requirements adjusted to account for the efficiencies of the drive motor and the auxiliary alternator.

The present invention is particularly advantageous in that it provides dual power capability by utilizing all of the equipment normally supplied on the locomotive, with the obvious exception of the diesel which, in third rail operation, is not provided any fuel and has its compression released. Furthermore, the present invention provides for third rail operation by minimizing the equipment required, thus avoiding unnecessary duplication of equipment.

Figure 1:
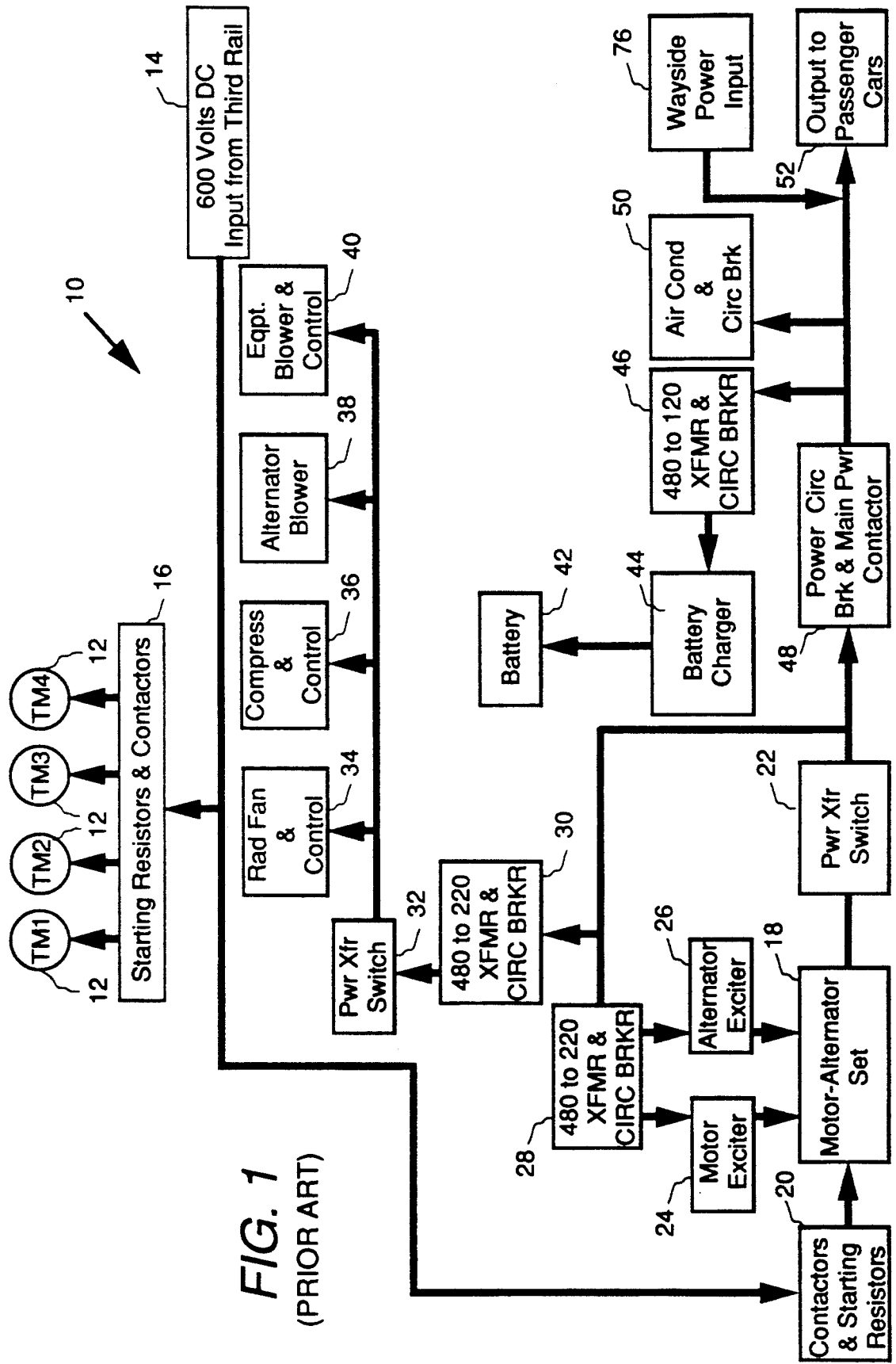
FIG. 1 is a prior art power flow schematic block diagram illustrating existing means for providing third rail power to a standard diesel electric passenger locomotive.

Referring now to the drawings, in FIG. 1 there is illustrated a prior art power flow schematic block diagram 10. Third rail power is used to provide the same locomotive functions that are normally provided by the diesel engine of the locomotive. In FIG. 1, traction power for the plurality of series DC traction motors 12 is supplied directly from the third rail power source 14 through a series of resistors and contactors 16. The resistors and contactors 16 provide variable voltage and power capability and are supplied specifically for this purpose.

Locomotive auxiliary power requirements and head end power are provided by a head end power system. Head end power is provided from the third rail by a DC motor-alternator set 18. This set 18 utilizes a compound wound DC motor driving a three phase alternator. The motor-alternator set 18 is provided specifically for third rail power operation. Additional starting resistors and contactors 20 are supplied to bring the motor-alternator set 18 up to its synchronous operating speed. A first power transfer switch 22 is then used to provide power for excitation, which requires inclusion of a motor exciter panel 24 and use of an alternator exciter panel 26, powered by a first circuit breaker and transformer block 28.

Continuing with FIG. 1, power to run the locomotive auxiliaries at a reduced speed is also supplied, requiring a second additional circuit breaker and transformer block 30, and a second power transfer switch 32. The second power transfer switch 32 provides power for a radiator fan and fan controller 34, a compressor drive motor and controller 36, an alternator blower 38, and equipment blowers and controls 40.

Power for charging of locomotive battery 42 through a battery charger 44, is supplied through a third additional circuit breaker and transformer block 46. A power circuit breaker and main power contactor block 48 ultimately supplies power for locomotive battery charging. The power circuit breaker and main power contactor block 48 also supplies sufficient power for air conditioning, through an air conditioning and circuit breaker system block 50. Finally, the power circuit breaker and main power contactor block 48 supplies sufficient power for the passenger cars that are attached to the locomotive, through output 52.

Figure 3:
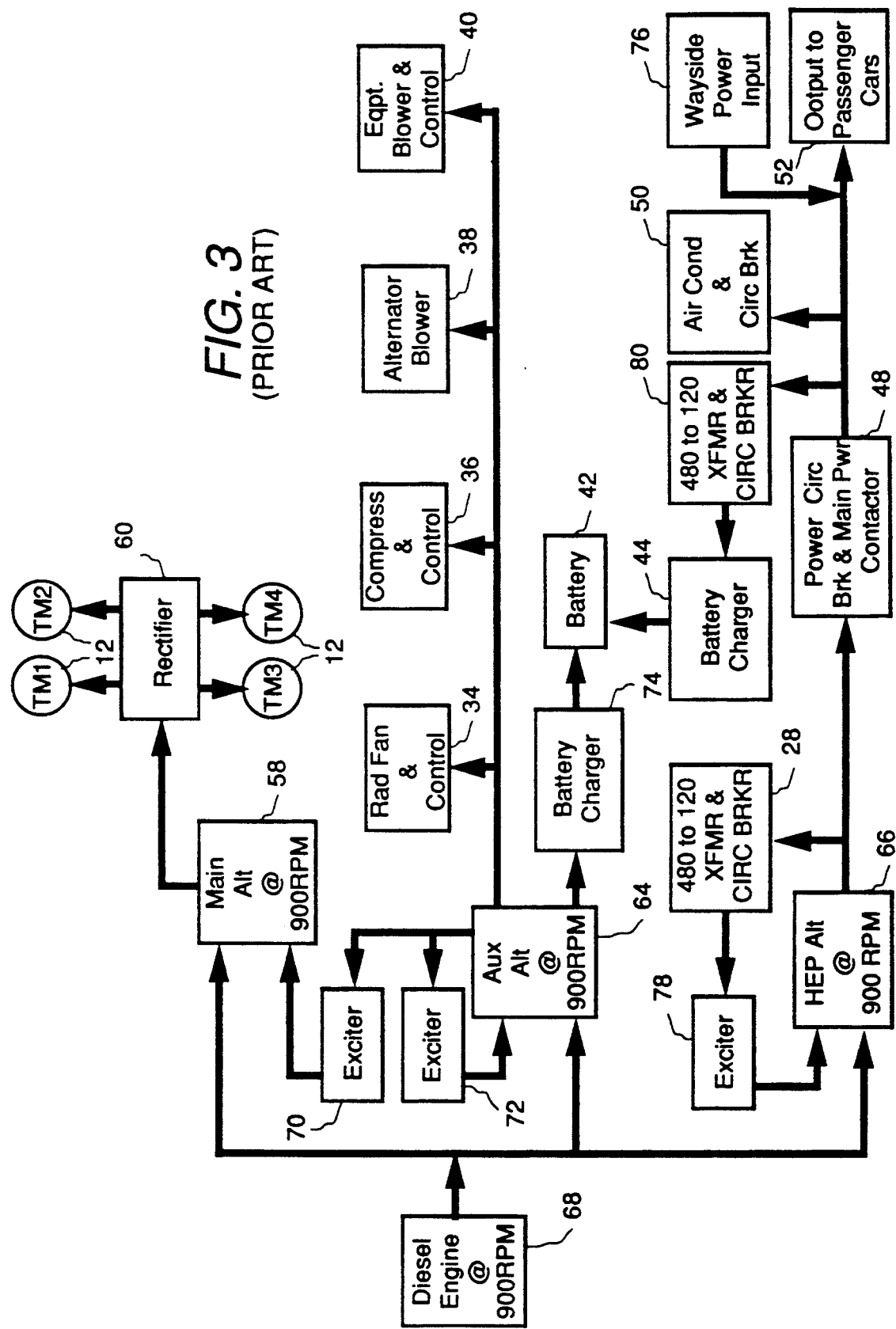
FIG. 3 is a prior art power flow schematic block diagram illustrating power flow on a standard diesel electric passenger locomotive operating on diesel power.

In FIG. 1, much of the equipment normally provided on a standard diesel electric passenger locomotive is not used for third rail power, as described in reference to FIG. 3, and much additional equipment is provided solely for third rail power operation. For instance, unused equipment includes the diesel engine, several exciter panels, the main alternator, the normal locomotive battery charger, the main alternator, the auxiliary alternator, the head end power alternator, and main propulsion rectifiers.

Furthermore, some of the additional equipment provided solely for third rail power operation is duplicative of the unused equipment. The additional equipment includes starting resistors and contactors 16 and 20; motor-alternator set 18, typically weighing 6.5 tons; the power transfer switches 22 and 32; exciter panel 24; circuit breaker and transformer block 30; and overall complexity, due to dual modes on the auxiliaries.

Figure 2:
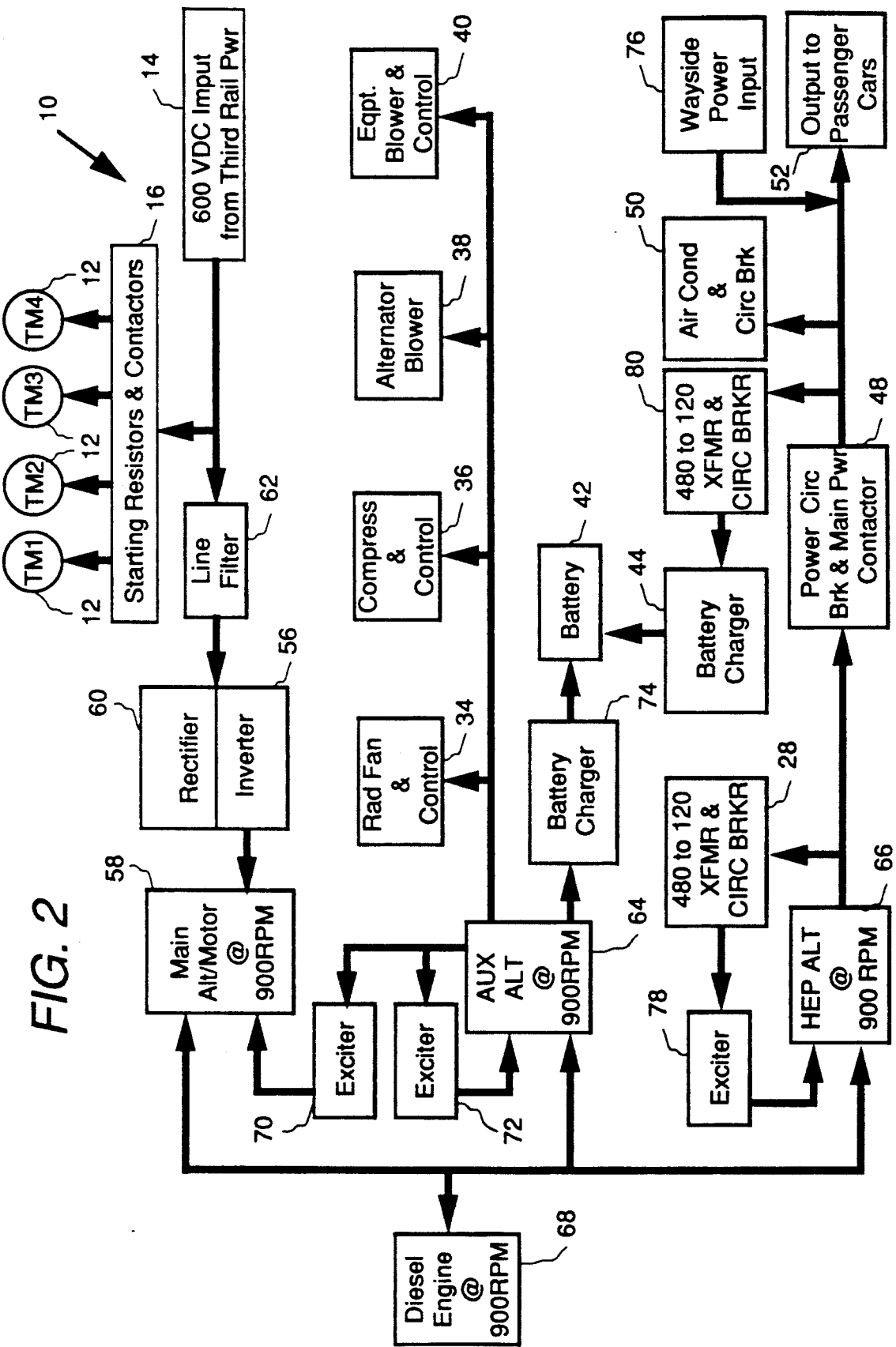
FIG. 2 is a power flow schematic block diagram, incorporating the present invention to provide third rail power to a standard diesel electric passenger locomotive.

Referring now to FIG. 2 there is illustrated a power flow schematic block diagram 54, incorporating the present invention to provide third rail power to a standard diesel electric passenger locomotive. As described in reference to FIG. 1, in FIG. 2 traction power for the plurality of series DC traction motors 12 is supplied directly from the third rail power source 14 through resistors and contactors 16. As in FIG. 1, the resistors and contactors 16 provide variable voltage and power capability and are supplied specifically for this purpose.

In FIG. 2, in accordance with the invention, a means for causing the main alternator of the locomotive to function as a motor for driving the power generating system of the locomotive when operating on third rail power, is provided. The conversion means is preferably an inverter 56. Main alternator 58 is then used as a synchronous motor driven by inverter 56. In the diesel engine, or "normal" mode, the power flow is reversed, and the alternator delivers power to a rectifier 60. In the third rail mode, power for the inverter 56 is supplied from the third rail power source 14 through a line filter 62, which must be added to the existing locomotive system. The line filter is positioned for reducing noise on the third rail. The power output of the main alternator/motor 58 is then used to provide power to auxiliary alternator 64 and head end power (HEP) alternator 66, since they are connected to the same shaft.

The auxiliary alternator 64 provides three voltage levels of output. One voltage level is a low voltage output supplied to exciter panels 70 and 72 for the main and auxiliary alternators, and can provide excitation for the traction motors 12 when they are connected as separately excited motors. The second voltage level is a medium voltage output which is supplied to battery charging rectifier and control 74. Battery 42 can also be charged via a wayside power connection 76 which is used, for example, if the diesel is shut down in a station and there is a need to keep control power on the locomotive. Control power for the locomotive is typically supplied from battery 42, to provide power for the locomotive lights, the locomotive heating, and other control power needed to run microprocessors and the like.

Continuing with FIG. 2, the third voltage level provided by the auxiliary alternator 64 is a high voltage output supplied to the radiator fan and fan controller 34, the compressor drive motor and controller 36, the alternator blower 38, and the equipment blowers and controls 40. All of these motors are typically three phase AC.

Head end power (HEP) is supplied to the HEP 480 volt, 60 Hertz, three phase alternator 66 through diesel engine 68 shaft which is driven by the main alternator/motor 58. This alternator provides power for self-excitation at exciter block 78 through a transformer and circuit breaker block 28. The HEP alternator 66 also provides power through the power circuit breaker and main power contactor 48 for air-conditioning on the locomotive, using air conditioning and circuit breaker block 50. The HEP alternator 66 further provides power through power circuit breaker and main power contactor 48 for battery charging of the locomotive at battery charger block 44, through a transformer and circuit breaker block 80. Finally, the HEP alternator 66 provides power, through output 52, for adequate heating, lighting, air conditioning, and other hotel loads for the passenger cars which are being pulled by the locomotive.

The present invention allows the locomotive to operate using either diesel engine power or third rail power. It is to be understood that the dual power capability means described herein may be used to advantage with any type of two rail transportation system equipped with an electrified third rail. The dual power capability means is illustrated for use with the locomotive for purposes of description only, and is not to be considered as limiting the invention.

It is an advantage of the present invention that third rail power can be supplied while eliminating the addition of a motor/alternator set weighing 6.5 tons; several power transfer switches; a motor excitation panel; main alternator set starting resistors and contactors; a circuit breaker and transformer block; and overall complexity in the control due to dual modes on auxiliaries.

In addition to eliminating much of the additional equipment required by the prior art standard diesel electric passenger locomotive for operating on third rail power, the present invention makes use of existing equipment to allow third rail power operation.

Referring now to FIG. 3, there is illustrated a prior art power flow schematic block diagram 82 for a standard diesel electric passenger locomotive operating on diesel power. In the diesel power mode, the diesel engine 68 provides power to the main alternator 58, and the auxiliary alternator 64. The auxiliary alternator 64 provides voltage to exciter panels 70 and 72 for providing excitation via the rectifier 60 to the traction motors 12. The auxiliary alternator also supplies voltage to the battery charger 74. Battery 42 can also be charged by the wayside power input 76, through battery charger 44. Finally, the auxiliary alternator supplies a voltage output to the radiator fan and fan controller 34, the compressor drive motor and controller 36, the alternator blower 38, and the equipment blowers and controls 40.

Continuing with FIG. 3, the diesel engine also provides power to the head end power alternator 66. The HEP alternator 66 provides power for the exciter block 78 via the transformer and circuit breaker block 28. The HEP alternator 66 also provides power through the power circuit breaker and main power contactor 48 for air-conditioning on the locomotive, using air conditioning and circuit breaker block 50. The HEP alternator 66 further provides power through power circuit breaker and main power contactor 48, for battery charging of the locomotive at battery charger block 44, through a transformer and circuit breaker block 80. Finally, the HEP alternator 66 provides power, through output 52, for the passenger cars which are being pulled by the locomotive.

The system of the present invention for providing dual power producing capability as illustrated in FIG. 2, makes use of existing equipment in FIG. 3 to provide third rail power, contrary to the prior art system illustrated in FIG. 1. As can be seen in FIGS. 1 and 3, to operate on third rail power, the prior art system adds additional equipment, i.e., blocks 16, 18, 20, 22, 24, 30 and 32, and does not make any use of certain existing equipment, i.e., blocks 58, 60, 64, 66, 68, 70, 72, and 74.

The present invention provides for a system and a method of providing dual power capability means for a diesel locomotive. Significant simplification exists because the locomotive auxiliary and hotel power controls are not duplicated, contrary to the prior art, for the present invention to provide third rail power means. The DC driven motor-alternator set, which is normally connected to the third rail in prior art third rail power mode to supply all of the auxiliary and hotel power, can be eliminated with the system of the present invention. The total weight savings resulting from this simplification, and the decreased installation space needs, provides a significant competitive advantage over the prior art.

Having described the invention in detail and by reference to the preferred embodiment thereof, it will be apparent that other modifications and variations are possible without departing from the scope of the invention defined in the appended claims.

What is claimed is:

1. An electrical system for providing dual power producing capability to a locomotive having a power generating system including a main alternator, the electrical system comprising:
 (a) an engine for driving the power generating system of the locomotive when operating under normal conditions; and
 (b) conversion means for driving the power generating system of the locomotive when operating on third rail power.

2. The electrical system as claimed in claim 1 wherein the conversion means comprises an inverter.

3. The electrical system as claimed in claim 2 wherein the alternator is adapted to crank the engine.

4. The electrical system as claimed in claim 1 further comprising a line filter for reducing noise on the third rail.

5. The electrical system as claimed in claim 1, wherein said engine comprises a diesel engine.

6. A method of providing dual power producing capability to an engine-driven locomotive having a power generating system including a main alternator, the method comprising the steps of:
 (a) driving the power generating system of the locomotive from said engine when operating under normal conditions; and
 (b) causing the main alternator to drive the power generating system of the locomotive when operating on third rail power with the engine shut down.

7. The method as claimed in claim 6 wherein the step of causing the main alternator to drive the power generating system of the locomotive comprises the step of supplying the third rail power to the main alternator through an inverter.

8. The method as claimed in claim 6 further comprising the step of providing a line filter for reducing noise on the third rail.

9. The method as claimed in claim 6, wherein said engine comprises a diesel engine.

10. An electrical system for providing uninterrupted transfer of power to a locomotive from an engine power source to a third rail power source, the locomotive having a power generating system, the electrical system comprising:

a main alternator;

an inverter for causing the main alternator to drive the power generating system of the locomotive when operating on the third rail power source; and means for powering up the inverter and simultaneously powering down the engine power source.

11. The electrical system as claimed in claim 10, wherein the engine of said engine power source comprises a diesel engine.

* * * * *

UNITED STATES PATENT AND TRADEMARK OFFICE
CERTIFICATE OF CORRECTION

PATENT NO. : 5,334,878

DATED : August 2, 1994

INVENTOR(S) : Laurence D. Vanek; Robert G. McGrath

It is certified that error appears in the above-identified patent and that said Letters Patent is hereby corrected as shown below: On the title page: Items
[75] Inventors: reads Laurence D. Vanek, Girard, N.Y.; Robert G. McGrath, North East, both of Pa.

[75] Inventors: should read Laurence D. Vanek, Ballston Spa, N.Y.; Robert G. McGrath, North East, PA

[73] Assignee: reads General Electric Company, Schenectady, N.Y.

[73] Assignee: should read General Electric Company, Erie, PA

Signed and Sealed this

Twenty-first Day of February, 1995

Attest:

BRUCE LEHMAN

*Attesting Officer*  *Commissioner of Patents and Trademarks*